United States Patent
Borowik et al.

(10) Patent No.: US 10,230,327 B2
(45) Date of Patent: Mar. 12, 2019

(54) METHOD FOR DETERMINING THE CARRIER LIFETIME

(71) Applicant: COMMISSARIAT A L'ENERGIE ATOMIQUE ET AUX ENERGIES ALTERNATIVES, Paris (FR)

(72) Inventors: Lukasz Borowik, Sassenage (FR); Nicolas Chevalier, Chabons (FR); Sylvain Pouch, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 279 days.

(21) Appl. No.: 15/088,329

(22) Filed: Apr. 1, 2016

(65) Prior Publication Data

US 2016/0294323 A1 Oct. 6, 2016

(30) Foreign Application Priority Data

Apr. 2, 2015 (FR) ...................................... 15 52830

(51) Int. Cl.
*H02S 50/15* (2014.01)
*G01Q 60/30* (2010.01)

(52) U.S. Cl.
CPC ............. *H02S 50/15* (2014.12); *G01Q 60/30* (2013.01)

(58) Field of Classification Search
CPC ...... H02S 50/15; G01Q 60/30; G01R 31/2656
See application file for complete search history.

(56) References Cited

U.S. PATENT DOCUMENTS

| 2004/0057052 A1* | 3/2004 | Borden | G01N 21/1717 356/445 |
| 2004/0063225 A1* | 4/2004 | Borden | G01N 21/21 438/7 |
| 2008/0315187 A1* | 12/2008 | Bazan | B82Y 10/00 257/40 |

OTHER PUBLICATIONS

Search Report as issued in French Patent Application No. 1552830, dated Feb. 1, 2016.

(Continued)

*Primary Examiner* — Changhyun Yi
(74) *Attorney, Agent, or Firm* — Pillsbury Winthrop Shaw Pittman LLP

(57) ABSTRACT

A method determines the carrier lifetime in a point of a surface of a sample, and includes in absence of illumination, measuring, at the point, a parameter P via atomic force microscopy technique (AFM) to obtain a value $P_{dark}$. The point is illuminated with a continuous light beam and the parameter P is measured, at the point, via AFM to obtain a value $P_{sat}$. The point is successively illuminated with continuous modulated light beams each having a different frequency $f_t$ that varies between a minimum frequency $f_{min}$ and a maximum frequency $f_{max}$, with the modulated light beams having a duty cycle D. For each modulated light beam, the parameter P is measured, at the point, via AFM in such a way as to obtain a value $P_{trans}^i$ for each frequency $f_i$. The carrier lifetime is calculated on point with the values of $P_{sat}$, $P_{dark}$, the duty cycle D, and $f_{max}$.

12 Claims, 5 Drawing Sheets

(56) References Cited

OTHER PUBLICATIONS

Takihara, M., et al., "Minority carrier lifetime in polycrystalline silicon solar cells studied by photoassisted Kelvin probe force microscopy," Applied Physics Letters, vol. 93, No. 2, Jul. 2008, pp. 21902-1-21902-3.
Borowik, L., et al., "Measuring the lifetime of silicon nanocrystal solar cell photo-carriers by using Kelvin probe force microscopy and x-ray photoelectron spectroscopy," Nanotechnology, vol. 25, No. 26, Jun. 2014, pp. 1-6.
Coffey, D.C., et al., "Time-resolved electrostatic force microscopy of polymer solar cells," Nature Materials, vol. 5, No. 9, Sep. 2006, pp. 735-740.
Glatzel, T., et al., "Principles of Kelvin Probe Force Microscopy," (New York: Springer), 2007, pp. 113-131.
Mélin, T., et al., "Electric force microscopy of individually charged nanoparticles on conductors: An analytical model for quantitative charge imaging," Physical Review B 69, 2004, pp. 035321-1-035321-8.
Teichert, C., et al., "Chapter 23: Conductive Atomic-Force Microscopy Investigation of Nanostructures in Microelectronics," Scanning Probe Microscopy in Nanoscience and Nanotechnology, vol. 2, Chapter 23, 2011, pp. 691-721.

\* cited by examiner

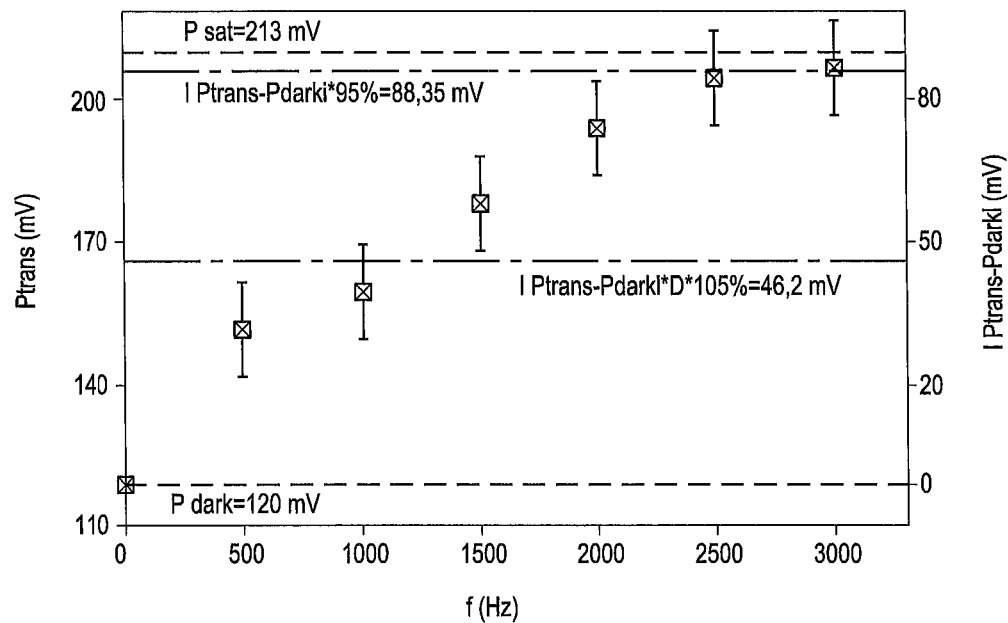
Fig. 7
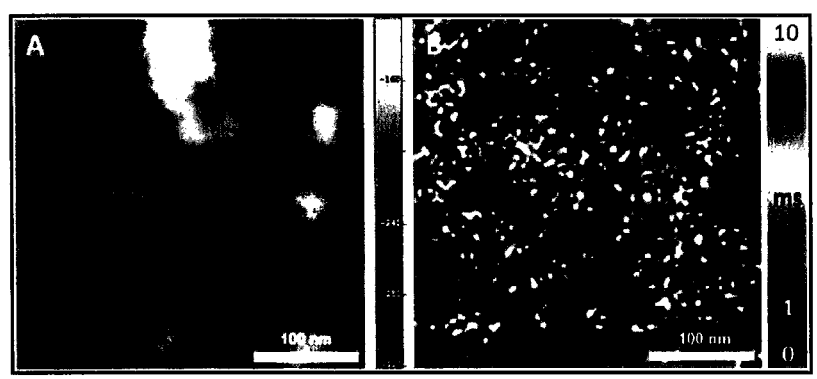
Fig. 8a  Fig. 8b ated here by reference in its entirety.
METHOD FOR DETERMINING THE CARRIER LIFETIME

CROSS-REFERENCE TO RELATED APPLICATIONS

This application claims priority to French Patent Application No. 1552830, filed Apr. 2, 2015, the entire content of which is incorporated herein by reference in its entirety.

FIELD

The invention relates to a method for the electrical characterisation of semiconductor materials, and more particularly, a method for determining the carrier lifetime of a semiconductor material.

BACKGROUND

The carrier lifetime τ plays an important role in the global effectiveness of solar photovoltaic cells, as it limits the proportion of photo-generated charges collected on electrodes. As such, it is desirable to have substantial carrier lifetimes in solar cells in order to maximise the quantity of charges collected on electrodes. The carrier lifetime τ, also called carrier recombination time or "photo carrier lifetime", is defined as the duration during which an electron excited by light remains in the conduction band before falling back into the valence band. The carrier lifetime must not be confused with the carrier generation lifetime, which is the duration required to convey an electron in the conduction band.

Prior art knows many methods for determining the carrier lifetime. As such, the document Coffey D, Ginger D, Time-resolved electrostatic force microscopy of polymer solar cells, 2006 Nature materials, 5, 735 propose to illuminate with a light source the surface of the sample of which it is desired to determine the carrier lifetime and to measure the decay of the electric signal obtained once this light source has been extinguished. Document Takihara Appl. Phys. Lett. 93, 021902 2008 proposes to illuminate the surface of the sample with a modulated light then to measure the surface potential via a Kelvin probe force microscopy technique.

However, the techniques of prior art make it possible only to obtain values of the carrier lifetime averaged over a relatively large surface of the sample. As such, none of the techniques of prior art makes it possible to map the carrier lifetime with good lateral resolution. Furthermore, the methods of prior art have a limited temporal resolution.

SUMMARY

An aspect of the invention aims to overcome the disadvantages of prior art by proposing a method for determining the carrier lifetime that has a good spatial resolution and good temporal resolution.

To do this, a method for determining a carrier lifetime in at least one point of a surface of a sample is proposed according to a first aspect of the invention, with the method comprising the following steps:
- in the absence of illumination, measuring, at the point, a parameter P via an atomic force microscopy technique in such a way as to obtain a value $P_{dark}$;
- illuminating the point with a continuous light beam;
- measuring, at the point, the parameter P via the atomic force microscopy technique in such a way as to obtain a value $P_{sat}$;
- successively illuminating the point with continuous modulated light beams each having a different frequency $f_i$, the frequency $f_i$ varying from one modulated light beam to the next, with the frequencies $f_i$ being between a minimum frequency $f_{min}$ and a maximum frequency $f_{max}$, with the modulated light beams having a duty cycle D;
- for each modulated light beam, measuring, at the point, the parameter P via the atomic force microscopy technique in such a way as to obtain a value $P_{trans}^i$ for each frequency $f_i$;
- calculating using a quadrature formula an interpolation S, at the point, of a curve representing $P_{trans}^i$ according to the frequencies $f_i$;
- calculating the carrier lifetime, at the point, by using the following formula:

$$\tau = \frac{\frac{x_0^2}{2} + x_0(D-1) - K}{\frac{S}{(P_{sat} - P_{dark})} - (1+D)f_{max}}$$

Wherein $x_o$ and K are constants.

The method is particularly beneficial because it makes it possible to determine the carrier lifetime using simple calculations at a precise point of the sample, in such a way that by reproducing this method at a multitude of points of the sample a map of the carrier lifetime can be created at the surface of a sample with a very good spatial resolution, i.e. with a spatial resolution less than 100 nm. The method can therefore be used to create a map of the carrier lifetime on materials that have a complex structure and strong variations of the carrier lifetime. Furthermore, contrary to the methods of prior art wherein the steps of calculating the carrier lifetime were very cumbersome and therefore very time consuming, the method according to an embodiment of the invention uses calculation steps that can be carried out very quickly is such a way that the map of the carrier lifetime can be created with a very good temporal resolution.

The method according to the first aspect of the invention can also have one or several of the characteristics hereinafter taken independently or according to any technically permissible combination.

The interpolation S can be calculated by several quadrature formulas.

As such, according to a first embodiment, the interpolation S is calculated by the following quadrature formula:

$$S = \sum_{i=1}^{i=N} (P_{trans}^i - P_{dark})(f_i - f_{i-1})$$

With $f_0=0$, $f_1=f_{min}$ and $f_N=f_{max}$

This method of calculating S is called the "zero-order rectangle method".

This method has the benefit of being simple.

According to a second embodiment, the interpolation S is calculated by the following quadrature formula:

$$S = \frac{1}{2}\sum_{i=1}^{i=N} (P_{trans}^i + P_{trans}^{i-1} - 2P_{dark})(f_i - f_{i-1})$$

With $f_0=0$, $f_1=f_{min}$ and $f_N=f_{max}$

This method of calculating S is called the "first-order trapezoid method".

This method is the most complex but also the most precise.

According to a third embodiment, the interpolation S is calculated by the following quadrature formula:

$$S = (P_{trans}^N - P_{dark})\left(\frac{f_N - f_{N-1}}{2}\right) + \sum_{i=1}^{i=N-1}(P_{trans}^i - P_{dark})\left(\frac{f_{i+1} - f_{i-1}}{2}\right)$$

With $f_0=0$, $f_1=f_{min}$ and $f_N=f_{max}$

This method of calculation is called the "first-order midpoint method".

This method has the benefit of being simple.

In an embodiment, the parameter $x_0$ has a value such that $g'(x_0)=0.95$ with $$g(x) = xe^{\frac{(D-1)}{x}}.$$

In an embodiment, the constant K is given by the following formula:

$$K = \sum_0^n (-1)^n \frac{1}{(n+2)!} x_0^{n+2} \times e^{\frac{(D-1)}{x_0}}$$

$$\sum_{b_1+2b_2+\cdots+nb_n=n} \frac{n!}{b_1!b_2!\ldots b_n!} \prod_{j=1}^n \left(\frac{(1+D)^j}{x_0^{j+1}}\right)^{b_j}$$

Several atomic force microscopy techniques can be used.

As such, according to a first embodiment, the atomic force microscopy technique used is a Kelvin force microscopy technique, with the parameter P measured being a contact potential difference.

According to a second embodiment, the atomic force microscopy technique used is an electrostatic force microscopy technique, with the parameter P measured being a frequency.

According to a third embodiment, the atomic force microscopy technique is a conductive atomic force microscopy technique, with the parameter P measured being a current.

The duty cycle of each modulated light beam is defined as being the ratio between the duration of illumination and the sum of the duration of illumination and of extinction. Beneficially, the duty cycle D is greater than the minimum duty cycle so that the carriers appear in the material and strictly less than 1.

According to an embodiment, each modulated light beam is a monochromatic beam.

In an embodiment, the frequency $f_i$ is increasing from one modulated light beam to the next, and it increases more desirably by following a logarithmic law.

A second aspect of the invention relates to a method of mapping the carrier lifetime of a surface of a sample, wherein the method of determining the carrier lifetime according to the first aspect of the invention is repeated at several points of the sample in such a way as to carry out a map of the carrier lifetime.

DESCRIPTION OF THE FIGURES

Other characteristics and benefits of the invention shall appear when reading the following detailed description, in reference to the annexed figures, which show.

Figure 5:
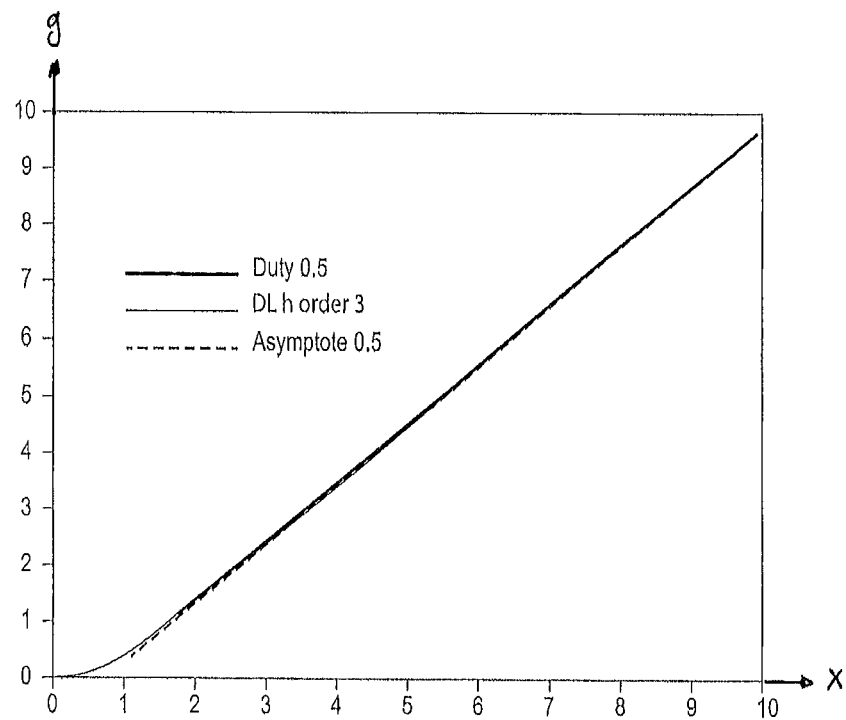
Figure 6:
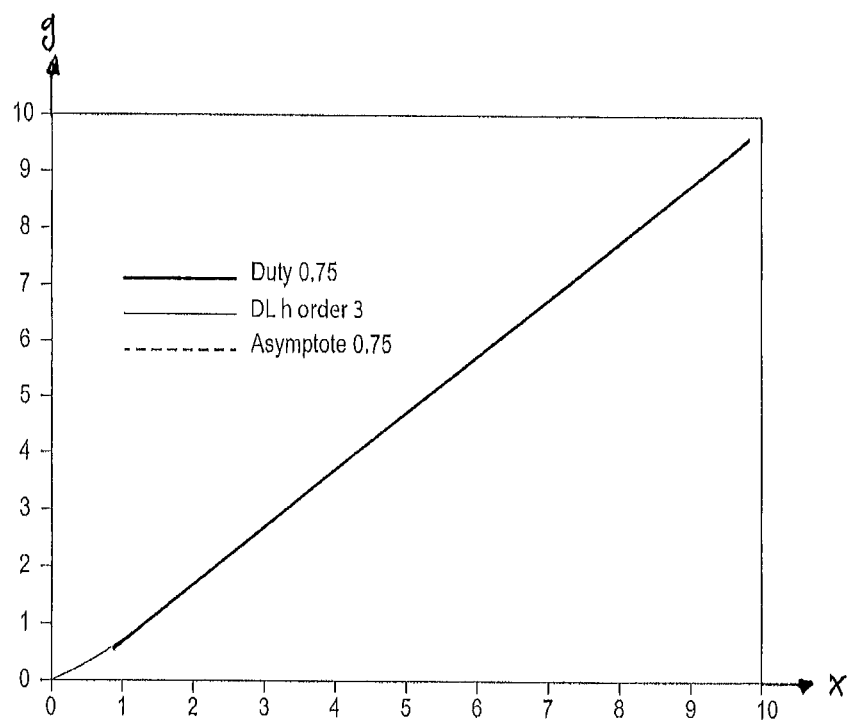

when the duty cycle D is equal to 0.25, as well as the approximation of this function over the interval $[0,x_0]$ and over the interval $[x_0,f_{max}\tau]$;

FIG. 5, a curve representing the function $$g(x) = xe^{\frac{(D-1)}{x}}$$

when the duty cycle D is equal to 0.5, as well as the approximation of this function over the interval $[0,x_0]$ and over the interval $[x_0,f_{max}\tau]$;

FIG. 6, a curve representing the function $$g(x) = xe^{\frac{(D-1)}{x}}$$

when the duty cycle D is equal to 0.75, as well as the approximation of this function over the interval $[0,x_0]$ and over the interval $[x_0,f_{max}\tau]$;

FIG. 7, a curve representing the evolution of the parameter $P_{trans}$ in 6 points according to the frequency f of the modulated light beam at the point of interest. The experimental values of $P_{dark}$ and of $P_{sat}$ are also shown;

FIGS. 8a and 8b, two images showing the map of the carrier lifetime (80×80 points) obtained by the method of rectangles and by the method of trapezoids.

DETAILED DESCRIPTION

Figure 1:
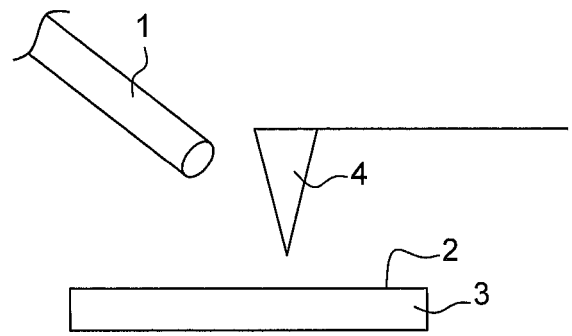
FIG. 1, a device making it possible to implement a method according to an embodiment of the invention.
Figure 2:
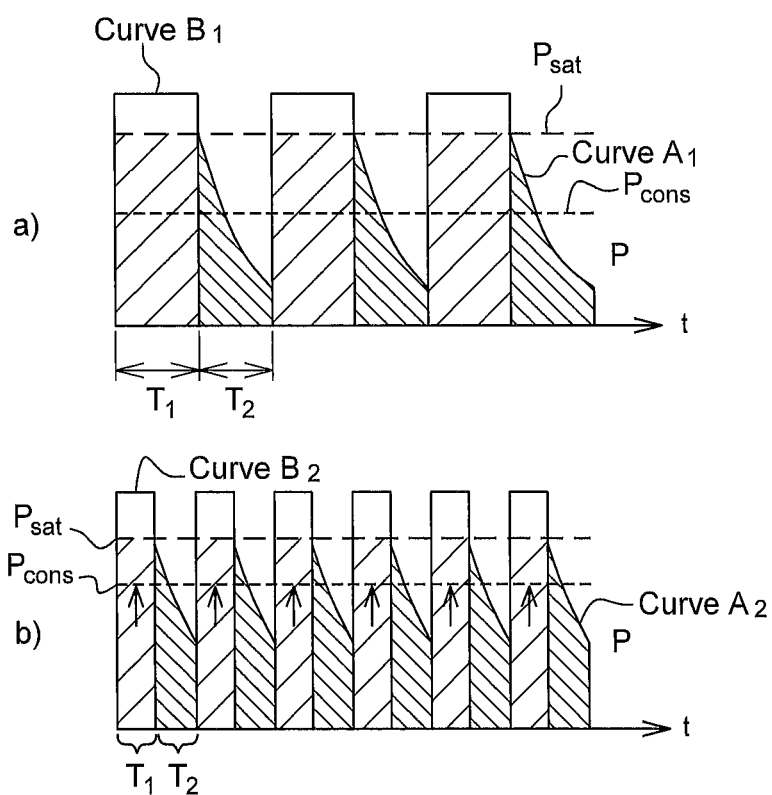
FIG. 2, curves representing the evolution of the intensity of a light beam illuminating a sample as a function of time and the evolution of the parameter P in this sample as a function of time.

FIG. 1 shows a device that makes it possible to implement a method according to an embodiment of the invention in such a way as to locally determine the carrier lifetime on the surface of a sample. This sample is a semiconductor material. The device comprises a light source 1 making it possible to emit a controlled light beam on a surface 2 of the sample 3. According to the steps of the method, this light beam can be:

extinguished,
continuous or
modulated, i.e. its intensity varies according to time.

The device also comprises an atomic force microscope 4 making it possible to locally measure a parameter P of the sample. The parameter P measured is a parameter that represents the charge carriers in the sample.

When the atomic force microscope is a Kelvin force microscope, the parameter P measured is a contact potential difference, in volts. The technique used to measure the contact potential difference via Kelvin force microscopy is for example detailed in the document Glatzel T, Lux-Steiner M C, Strassburg E, Boag A and Rosenwaks Y 2007 Principles of Kelvin Probe Force Microscopy (New York: Springer) pp 113-31.

When the atomic force microscope is an electrostatic force microscope, the parameter P measured is a frequency, in Hz. The technique used to measure the frequency via electrostatic force microscopy is for example detailed in the document Electric force microscopy of individually charged nanoparticles on conductors: An analytical model for quantitative charge imaging"—T. Mélin, H. Diesinger, D. Deremies, D. Stiévenard, Physical Review B, 69, 3 (2004).

When the atomic force microscope is a conductive atomic force microscope (Conducting AFM), the parameter P is a current, in amperes. The technique used to measure this current via conductive atomic force microscopy is for example detailed in the document C. Teichert and I. Beinik, in Scanning Probe Microscopy in Nanoscience and Nanotechnology, edited by B. Bhushan, Vol. 2, Chap. 23 (Springer, Berlin, 2011).

Figure 3A:
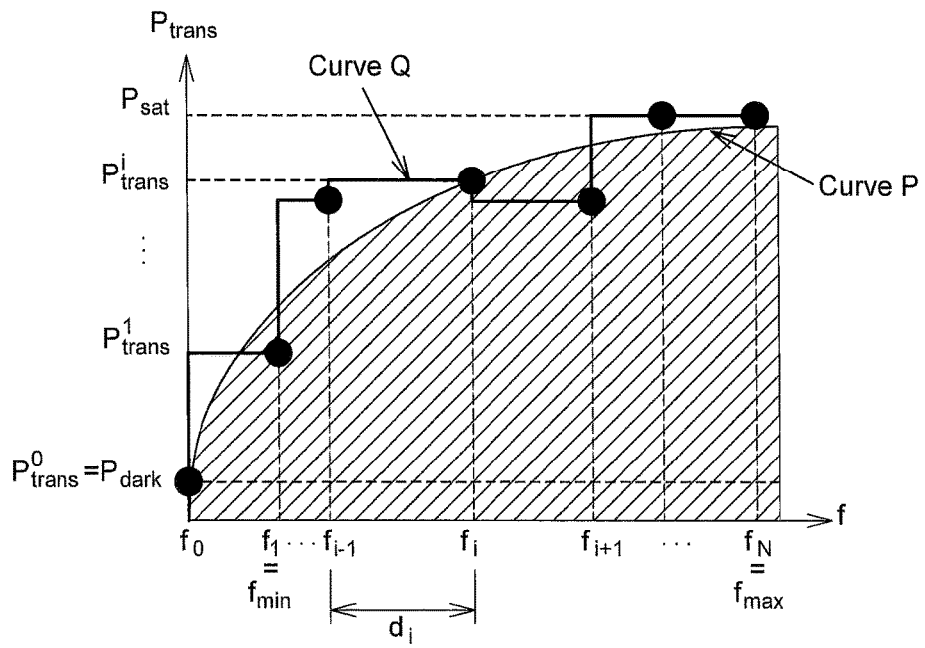
FIG. 3a, a curve representing the evolution of the parameter Q calculated by the method of rectangles and that of the parameter P according to the frequency of the modulated light beam.
Figure 3B:
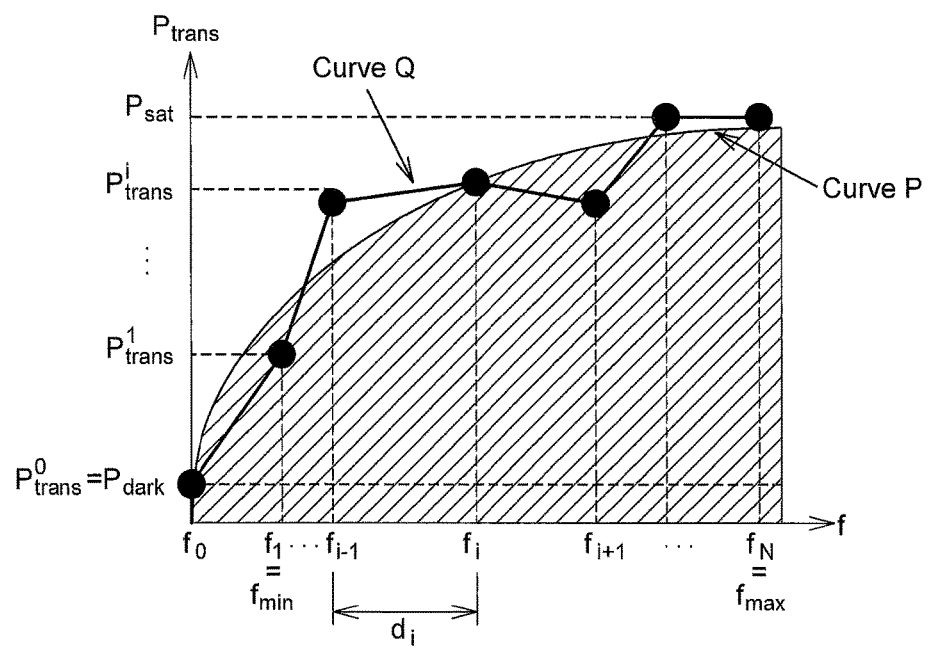
FIG. 3b, a curve representing the evolution of the parameter Q calculated by the method of trapezoids and that of the parameter P according to the frequency of the modulated light beam.
Figure 3C:
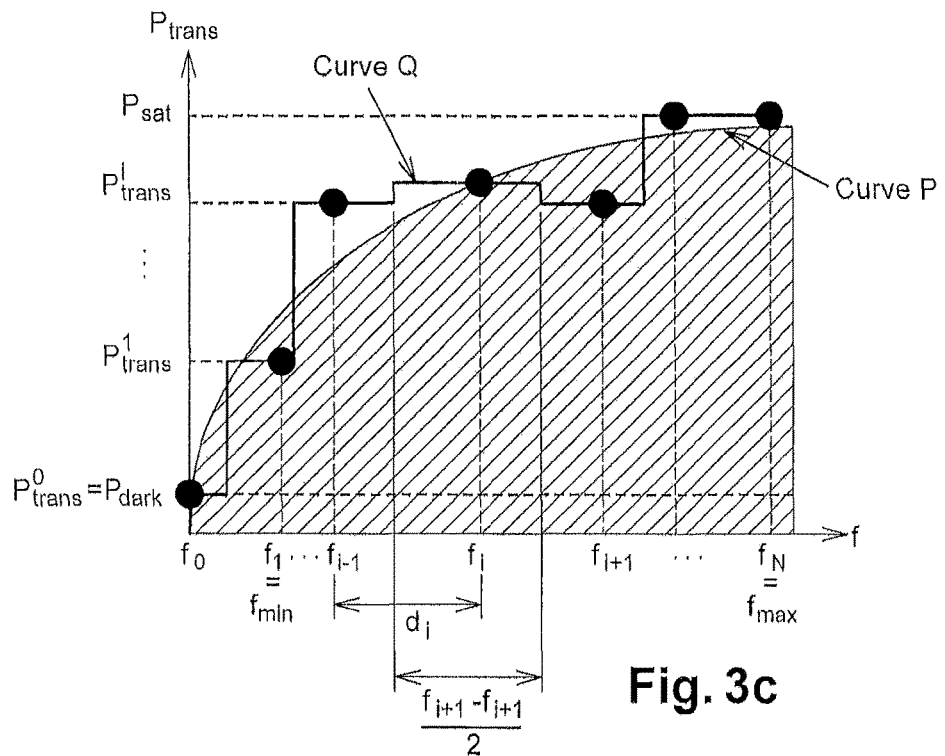
FIG. 3c, a curve representing the evolution of the parameter Q calculated by the midpoint method and that of the parameter P according to the frequency of the modulated light beam.

FIG. 3 shows the evolution of the parameter P (curves B1 and B2) according to the evolution of the intensity of the modulated light beam (curves A1 and A2). The parameter P being representative of the charge carriers in the material, it varies with the illumination of the material, and in particular with the frequency of the modulated light beam. As such, the parameter P increases or decreases when the frequency $f_i$ of the modulated light beam increases and approaches an asymptotic value $P_{sat}$. This asymptotic value $P_{sat}$ corresponds to the value of the parameter P when the sample is illuminated with a continuous light beam. When the sample is illuminated with a modulated light beam having a duty cycle D and a frequency $f_i$, the parameter P is equal to $P_{trans}^i$. The more the frequency $f_i$ of the modulated light beam increases, the more the value of $P_{trans}^i$ approaches $P_{sat}$ as shown in FIG. 3.

The method according to an embodiment of the invention makes it possible to easily and precisely determine the carrier lifetime. The method shall now be explained when it is applied to determine the carrier lifetime at a point of the sample, called "point of interest" in what follows.

The method firstly comprises a step of measuring the parameter P via an atomic force microscopy technique at the point of interest in the absence of illumination. As such a value $P_{dark}$ is obtained.

The method then comprises a step during which the point of interest is illuminated with a continuous light beam. The intensity of the continuous light beam has to be identical to the instant intensity of the pulse of the modulated light. The method then comprises a step of measuring the parameter P at the point of interest. As such a value $P_{sat}$ is obtained.

The method then comprises a series of steps, each one comprising the following substeps:

the point of interest is illuminated with a modulated light beam having a frequency $f_i$ and a duty cycle D. The duty cycle D is defined as being the ratio between the duration T1 of illumination during a cycle over the total duration T1+T2 of a cycle. The duty cycle D is in an embodiment chosen strictly less than 1. Furthermore, the duty cycle D is desirably chosen in such a way that the duration T1 of illumination is greater than the carrier generation lifetime;

the parameter P is measured at the point of interest in such a way as to obtain a value $P_{trans}^i$.

These substeps are repeated by modifying at each time the frequency $f_i$. As such, between two successive steps of this series of steps, the frequency $f_i$ increases, while the duty cycle remains desirably constant. During the first step of this series of steps, the frequency $f_i$ is equal to $f_{min}$. During the last step of this series of steps, the frequency $f_i$ is equal to $f_{max}$. The maximum frequency $f_{max}$ is chosen in such a way that, when $f_i$ is equal to $f_{max}$, the value $|P_{trans}-P_{dark}|$ measured is greater than or equal to 95% of the value $|P_{sat}-P_{dark}|$ measured. $f_{min}$ is chosen in such a way that, when $f_i$ is equal to $f_{min}$ the value $|P_{trans}-P_{dark}|$ measured is less than $105\% * D * |P_{sat}-P_{dark}|$, where D is the duty cycle of the modulated light. In an embodiment, $P_{trans}$ is measured at least for 5 frequencies with the frequency pitch constant in order to have good precision on the estimation of the carrier lifetime.

Once the parameter P has been measured for each modulated light beam having a given frequency, the method comprises a step of calculating an interpolation S via a quadrature formula of a curve representing $P_{trans}^i$ as a function of $f_i$.

For this, several different quadrature formulas can be used.

As such, according to a first embodiment, a so-called rectangle method is used, wherein S is calculated by using the following formula:

$$S = \sum_{i=1}^{i=N} (P_{trans}^i - P_{dark})(f_i - f_{i-1})$$

According to a second embodiment, a so-called trapezoid method is used, wherein S is calculated by using the following formula:

$$S = \frac{1}{2}\sum_{i=1}^{i=N} (P_{trans}^i + P_{trans}^{i-1} - 2P_{dark})(f_i - f_{i-1})$$

With $f_0=0$, $f_1=f_{min}$ and $f_N=f_{max}$

According to a third embodiment, a so-called midpoint method is used, wherein S is calculated by using the following formula:

$$S = (P_{trans}^N - P_{dark})\left(\frac{f_N - f_{N-1}}{2}\right) + \sum_{i=1}^{i=N-1} (P_{trans}^i - P_{dark})\left(\frac{f_{i+1} - f_{i-1}}{2}\right)$$

With $f_0=0$, $f_1=f_{min}$ and $f_N=f_{max}$

The trapezoid method is more complex but also more precise than the rectangle method and the midpoint method. The method operates correctly with the three methods.

The method then comprises a step of calculating the carrier lifetime thanks to the following formula:

$$\tau = \frac{\frac{x_0^2}{2} + x_0(D-1) - K}{\frac{S}{(P_{sat} - P_{dark})} - (1+D)f_{max}}$$

Wherein $x_o$ and K are constants.

The constant $x_0$ correspond to the X-axis starting from which the curve representing $$g(x) = xe^{\frac{(D-1)}{x}}$$

has an asymptotic behaviour. The point $x_0$ is calculated in such a way that $g'(x_0)=C$. In an embodiment, C is greater than or equal to 0.95. For example, for a value of C=0.95 and a duty cycle of 0.5, we obtain $x_0=1.4$.

The constant K is calculated with the following formula:

$$K = \sum_0^n (-1)^n \frac{1}{(n+2)!} x_0^{n+2} \times h^{(n)}(x_0) = \text{constant}$$

where $h^{(n)}(x)$ is the $n^{th}$ derivative of the real function $$e^{\frac{(D-1)}{x}}$$

calculated for $x=x_0$.

The $n^{th}$ derivative is calculated using the relation:

$$h^{(n)}(x) = e^{\frac{(D-1)}{x}} \sum_{b_1+2b_2+\cdots+nb_n=n} \frac{n!}{b_1! b_2! \ldots b_n!} \prod_{j=1}^n \left(\frac{(1+D)^j}{x^{j+1}}\right)^{b_j}.$$

The method is therefore particularly beneficial because it makes it possible to calculate using simple but precise calculations the carrier lifetime at a point of the sample.

It will be appreciated that the totality of the steps of the above method act in concert to improve the technical field of determining the carrier lifetime of a semiconductor material.
Justification of the Calculations Performed:

In reference to FIG. 3, the principle of the calculation performed shall now be explained.

The value of the parameter P when the sample is continuously illuminated is given by $P_{sat}$. The value of the parameter P when the sample is not illuminated is given by $P_{dark}$. The value of the parameter P when the sample is illuminated by a modulated light beam of frequency f is given by $P_{trans}$. In order to simplify the demonstration that follows, instead of considering $P_{trans}$ and $P_{sat}$, interest is given to:

$P_{av}=P_{trans}-P_{dark}$ and $P_{max}=P_{sat}-P_{dark}$.

$P_{av}$, depends on the frequency f by following the following relation:

$$P_{av} = P_{max}\left(D + \tau f\left(1 - e^{\left(\frac{D-1}{\tau f}\right)}\right)\right)$$

Wherein:

$\tau$ is the carrier lifetime;

f is the frequency of the modulated light that is illuminating the sample;

D is the duty cycle of the modulated light that is illuminating the sample.

In order to extract the carrier lifetime $\tau$, it is sought to calculate the integral of $P_{av}$. In order to simplify this calculation, this integral is approximated via the following interpolation S:

$$\int_0^{f_{max}} P_{av}(f) df \approx \sum_{i=1}^{i=N} P_{av}^i d_i = S$$

With:

$P_{av}^i$, the $i^{th}$ experimental measuring point, defined by $P_{trans}^i - P_{dark}$ when the rectangle method is used or by $(P_{trans}^i + P_{trans}^{i-1} - 2P_{dark})$ when the trapezoid method is used.

$d_i = f_i - f_{i-1}$ the frequency interval defined between the points of measure i and i+1, $f_{max}$ the maximum measuring frequency.

N shows the number of measurements made in the frequency range between $f_{min}$ and $f_{max}$.

Diagrammatically, this results in approximating that the area under the curve P of FIG. 3 is equal to the area under the curve Q of the same figure.

We therefore seek to calculate:

$$\int_0^{f_{max}} P_{av}(f) df = P_{max} \int_0^{f_{max}} \left\{D - f\tau\left(e^{\frac{-(1-D)}{f\tau}} - 1\right)\right\} df$$

$$= P_{max}\left\{\int_0^{f_{max}} D\, df + \int_0^{f_{max}} f\tau\, df + \int_0^{f_{max}} -f\tau e^{\frac{-(1-D)}{f\tau}} df\right\}$$

We therefore seek to calculate the following three integrals:

$$\int_0^{f_{max}} D\, df = Df_{max} \tag{1}$$

$$\int_0^{f_{max}} f\tau\, df = \frac{f_{max}^2 \tau}{2} \tag{2}$$

$$\int_0^{f_{max}} -f\tau e^{\frac{-(1-D)}{f\tau}} df \tag{3}$$

The integrals (1) and (2) are constants that are easy to calculate. The third integral however does not have a simple analytical solution. Nevertheless, the function to be integrated can be broken down on the one hand through a limited development and on the other hand via its asymptote.

Let $x=f\tau$. In this case the function to be integrated is re-written $$g(x) = xe^{\frac{(D-1)}{x}}$$

The integration limits of this function are $[x_0, f_{max}\tau]$ with $f_{max}\tau$ typically varying from 1 to 100.

The calculation of the integral of the function $$g(x) = xe^{\frac{(D-1)}{x}}$$

is carried out as follows:
For $x \leq x_0$, the integral of the function is approximated by its limited development as $x=x_0$.
For $x > x_0$, the integral of the function is approximated by an affine function.

The point $x_0$ corresponds to the X-axis starting from which the curve representing $$g(x) = xe^{\frac{(D-1)}{x}}$$

has an asymptotic behaviour. The point $x_0$ is calculated in such a way that $g'(x_0)=C$. In an embodiment, C is greater than or equal to 0.95. For example, for a value of $C=0.95$ and a duty cycle of 0.5, a value of $x_0=1.4$ is obtained.

Approximation of the Function g(x) Over the Interval $[0,x_0]$:

The function $g(x)=xh(x)$ is approximated by a function over the interval $[0,x_0]$.

For this, the function $$g(x) = xe^{\frac{(D-1)}{x}} = x \times h(x)$$

is considered with $$h(x) = e^{\frac{(D-1)}{x}}$$

A limited development of order n is carried out of the function h(x) at the point $x=x_0$.

$$h(x) = \sum_{0}^{n} \frac{1}{n!} h^{(n)}(x_0)(x-x_0)^n$$

With $h(n)(x_0)$ the $n^{th}$ derivative of the function h(x) calculated for $x=x_0$ and defined by:

$$h^{(n)}(x_0) = e^{\frac{(D-1)}{x_0}} \sum_{b_1+2b_2+\cdots+nb_n=n} \frac{n!}{b_1!b_2!\ldots b_n!} \prod_{j=1}^{n} \left(\frac{(1+D)^j}{x_0^{j+1}}\right)^{b_j}$$

The function $$g(x) = xe^{\frac{(D-1)}{x}}$$

is therefore approximated over the interval $[0,x_0]$ by a function equal to:

$$g(x) = xe^{\frac{(D-1)}{x}} \approx x \times \sum_{0}^{n} \frac{1}{n!} h^{(n)}(x_0)(x-x_0)^n$$

In an embodiment, n is equal to 3. In this case:

$$h(x) = h(x_0) + \frac{1}{1!}h^{(1)}(x_0)(x-x_0) + \frac{1}{2!}h^{(2)}(x_0)(x-x_0)^2 + \frac{1}{3!}h^{(3)}(x_0)(x-x_0)^3$$

where $h^{(1)}$, $h^{(2)}$, $h^{(3)}$ are respectively the first, second and third derivatives of the function h(x) defined by the following relations:

$$h^{(1)} = -\frac{(D-1)}{x^2} h(x)$$

$$h^{(2)} = \left(-\frac{2}{x} - \frac{(D-1)}{x^2}\right) h'(x)$$

$$h^{(3)} = \left(\frac{6}{x^2} + \frac{6(D-1)}{x^3} + \frac{(D-1)^2}{x^4}\right) h'(x)$$

For n=3, the function g(x) is therefore approximated over the interval $[0,x_0]$ by a function equal to $$x_0 \times \left(h(x_0) + \frac{1}{1!}h^{(1)}(x_0)(x-x_0) + \frac{1}{2!}h^{(2)}(x_0)(x-x_0)^2 + \frac{1}{3!}h^{(3)}(x_0)(x-x_0)^3\right)$$

Approximation of the Function g(x) for $x>x_0$:

The function g(x) is approximated by an affine function of the type $ax+b$ for $x>x_0$.

The slope a is given by the relation:

$$a = \lim_{x \to \infty} \frac{g(x)}{x} = \lim_{x \to \infty} e^{\frac{D-1}{x}} = 1$$

The ordinate at the origin b is given by the relation:

$$b = \lim_{x \to \infty} g(x) - ax = \lim_{x \to \infty} x(e^{\frac{D-1}{x}} - 1) \approx \lim_{x \to \infty} x\left(1 + \frac{D-1}{x} - 1\right) = D - 1$$

Figure 4:
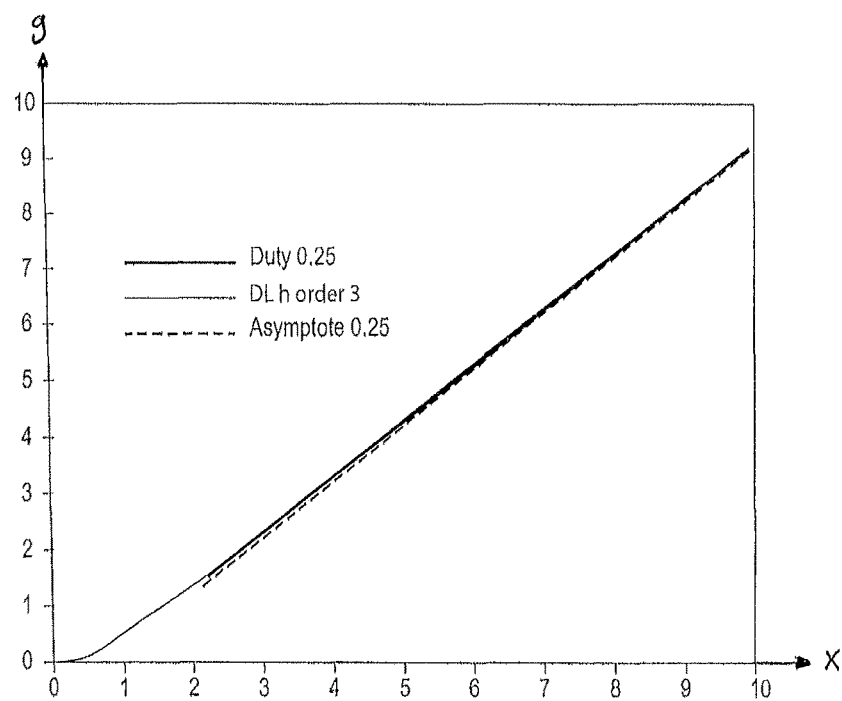
FIG. 4, a curve representing the function $$g(x) = xe^{\frac{(D-1)}{x}}$$

The following affine function $x+(D-1)$ is obtained as an approximation of the function g(x) over the interval $[x_0, f_{max}\tau]$ Graphic Representation FIG. 4 shows the function g(x) when the duty cycle D is equal to 0.25, as well as its approximation over the interval $[0,x_0]$ and that over the interval $[x_0,f_{max}\tau]$. When the duty cycle D is equal to 0.25, $x_0=2$.

FIG. 5 shows the function g(x) when the duty cycle D is equal to 0.5, as well as its approximation over the interval $[0,x_0]$ and that over the interval $[x_0,f_{max}\tau]$. When the duty cycle D is equal to 0.5, $x_0=1.4$.

FIG. 6 shows the function g(x) when the duty cycle D is equal to 0.75, as well as its approximation over the interval $[0,x_0]$ and that over the interval $[x_0,f_{max}\tau]$. When the duty cycle D is equal to 0.75, $x_0=0.8$.

Calculation of the Integral of the Function g(x) Over the Interval $[0,f_{max}\tau]$ It is sought to evaluate the following integral:

$$\int_0^{f_{max}} -f\tau e^{\frac{-(1-D)}{f\tau}} df =$$

-continued $$-\frac{1}{\tau}\int_0^{f_{max}\tau} xe^{\frac{D-1}{x}}dx = -\frac{1}{\tau}\left(\int_0^{x_0} xe^{\frac{D-1}{x}}dx + \int_{x_0}^{f_{max}\tau} xe^{\frac{D-1}{x}}dx\right)$$

Which is broken down into a sum of two integrals:
Integral No. 1:

In order to calculate this integral over the interval $[0,x_0]$, use is made of the limited development of order n explained hereinabove:

$$\int_0^{x_0} g(x)dx = \int_0^{x_0} xe^{\frac{(D-1)}{x}}dx \approx \int_0^{x_0} x\sum_0^n \frac{1}{n!}h^{(n)}(x_0)(x-x_0)^n dx$$

The functions can be derived to infinity, the integrals are limited. The following is thus obtained:

$$\int_0^{x_0} g(x)dx \approx \sum_0^n \int_0^{x_0} x\frac{1}{n!}h^{(n)}(x_0)(x-x_0)^n dx$$

$$= \sum_0^n \frac{1}{n!}h^{(n)}(x_0)\int_0^{x_0} x(x-x_0)^n dx$$

By carrying out an integration in portions, we obtain:

$$\int_0^{x_0} g(x)dx \approx \sum_0^n \frac{1}{n!}h^{(n)}(x_0)\left(-\int_0^{x_0} \frac{(x-x_0)^{n+1}}{n+1}dx\right)$$

$$\int_0^{x_0} g(x)dx \approx \sum_0^n \frac{1}{n!}h^{(n)}(x_0)\left(\frac{(-x_0)^{n+2}}{(n+1)(n+2)}\right)$$

$$\int_0^{x_0} g(x)dx \approx \sum_0^n \frac{(-1)^n}{(n+2)!}h^{(n)}(x_0)x_0^{n+2} = K = \text{constant}$$

K being a constant that does not depend on $\tau$
In an embodiment, n is equal to 3. In this case, $$K = \frac{x_0^2}{2}h(x_0) - \frac{x_0^3}{6}h'(x_0) + \frac{x_0^4}{24}h''(x_0) - \frac{x_0^5}{120}h'''(x_0)$$

Integral No. 2:

In order to calculate this integral over the interval $[x_0, f_{max}\tau]$, use is made of the expression of the asymptotic function explained hereinabove. The following is obtained:

$$\int_{x_0}^{f_{max}\tau} xe^{\frac{D-1}{x}}dx \sim \int_{x_0}^{f_{max}\tau}(x+(D-1))dx =$$

$$\int_{x_0}^{f_{max}\tau} xdx + (D-1)\int_{x_0}^{f_{max}\tau} dx$$

$$\int_{x_0}^{f_{max}\tau} xe^{\frac{D-1}{x}}dx \sim \left(\frac{(f_{max}\tau)^2}{2} - \frac{x_0^2}{2}\right) + (D-1)(f_{max}\tau - x_0)$$

As such an approached analytical expression for the integral is obtained $$\int_0^{f_{max}} -f\tau e^{\frac{-(1-D)}{f\tau}}df$$

$$\int_0^{f_{max}} -f\tau e^{\frac{-(1-D)}{f\tau}}df \sim -\frac{K}{\tau} - \left(\frac{\tau f_{max}^2}{2} - \frac{x_0^2}{2\tau}\right) + (1-D)\left(f_{max} - \frac{x_0}{\tau}\right)$$

$$\int_0^{f_{max}} -f\tau e^{\frac{-(1-D)}{f\tau}}df \sim -\frac{K}{\tau} - \frac{\tau f_{max}^2}{2} + \frac{x_0^2}{2\tau} + (1-D)f_{max} - (1-D)\frac{x_0}{\tau}$$

$$\int_0^{f_{max}} -f\tau e^{\frac{-(1-D)}{f\tau}}df \sim -\frac{\tau f_{max}^2}{2} + \frac{1}{\tau}\left(\frac{x_0^2}{2} + x_0(D-1)\right) + (1-D)f_{max} - \frac{K}{\tau}$$

Expression of Carrier Lifetime

The integral $\int_0^{f_{max}} P_{av}(f)df$ is therefore written in an approached analytical form $$\int_0^{f_{max}} P_{av}(f)df =$$

$$P_{max}\left\{\int_0^{f_{max}} Ddf + \int_0^{f_{max}} f\tau df + \int_0^{f_{max}} -f\tau e^{\frac{-(1-D)}{f\tau}}df\right\}$$

$$\int_0^{f_{max}} P_{av}(f)df =$$

$$P_{max}\left(DF + \frac{f_{max}^2\tau}{2} - \frac{\tau f_{max}^2}{2} + \frac{1}{\tau}\left(\frac{x_0^2}{2} + x_0(D-1)\right) + (1-D)f_{max} - \frac{K}{\tau}\right) = S$$

$$\int_0^{f_{max}} P_{av}(f)df = P_{max}\left(\frac{1}{\tau}\left(\frac{x_0^2}{2} + x_0(D-1)\right) + (1+D)f_{max} - \frac{K}{\tau}\right) = S$$

$$\int_0^{f_{max}} P_{av}(f)df = P_{max}\left(\frac{1}{\tau}\left(\frac{x_0^2}{2} + x_0(D-1) - K\right) + (1+D)f_{max}\right) = S$$

From this expression is extracted the carrier lifetime $\tau$ given by the following relation $$\tau = \frac{\frac{x_0^2}{2} + x_0(D-1) - K}{\frac{S}{P_{max}} - (1+D)f_{max}}$$

This expression can also be expressed in the following form:

$$\tau = \frac{\frac{x_0^2}{2} + x_0(D-1) - K}{\frac{S}{(P_{sat} - P_{dark})} - (1+D)f_{max}}$$

With $x_0$ the point corresponding to the Y-axis starting from which the curve representing $$g(x) = xe^{\frac{(D-1)}{x}}$$

has an asymptotic behaviour. The point $x_0$ is calculated in such a way that $g'(x_0)=C$. In an embodiment, C is greater than or equal to 0.95. For example, for a value of C=0.95 and a duty cycle of 0.5, it is easy to find the value of $x_0=1.4$ using a spreadsheet.

$$K = \sum_{0}^{n} (-1)^n \frac{1}{(n+2)!} x_0^{n+2} \times h^{(n)}(x_0) = \text{constant}$$

wherein $h^{(n)}(x)$ is the $n^{th}$ derivative of the real function $$e^{\frac{(D-1)}{x}}$$

calculated for $x=x_0$. The $n^{th}$ derivative is calculated using the relation:

$$h^{(n)}(x) = e^{\frac{(D-1)}{x}} \sum_{b_1+2b_2+\cdots+nb_n=n} \frac{n!}{b_1!b_2!\ldots b_n!} \prod_{j=1}^{n} \left(\frac{(1+D)^j}{x^{j+1}}\right)^{b_j}.$$

As indicated hereinabove, the interpolation S can be calculated by using several quadrature formulas and in particular the rectangle method and the trapezoid method.

According to the rectangle method:

$$S = \sum_{i=1}^{i=N} (P_{trans}^i - P_{dark})(f_i - f_{i-1})$$

With $f_0=0$, $f_1=f_{min}$ and $f_N=f_{max}$
According to the trapezoid method:

$$S = \frac{1}{2} \sum_{i=1}^{i=N} (P_{trans}^i + P_{trans}^{i-1} - 2P_{dark})(f_i - f_{i-1})$$

where $f_0=0$, $f_1=f_{min}$ and $f_N=f_{max}$
According to the midpoint method:

$$S = (P_{trans}^N - P_{dark})\left(\frac{f_N - f_{N-1}}{2}\right) + \sum_{i=1}^{i=N-1} (P_{trans}^i - P_{dark})\left(\frac{f_{i+1} - f_{i-1}}{2}\right)$$

With $f_0=0$, $f_1=f_{min}$ and $f_N=f_{max}$

These expressions of S are particularly beneficial as they make it possible to easily calculate the carrier lifetime, without having to perform the complicated integral calculation, but while still obtaining a precise value for the carrier lifetime.

By reproducing the method explained hereinabove for a multitude of points of a sample, a very precise and very rapid map of the carrier lifetime can as such be obtained, even when the sample has a complex structure.

First Example of Implementation

The method shall now be described in detail in the case where the parameter P is a contact potential difference, measured in volts by Kelvin probe force microscopy. The sample whereon is carried out this example is a sample of PBTFB:PCBM (ratio 1:3) Poly(Bi-Thiophene-Fluorene-Benzothiadiazole): [6,6]-Phenyl-C71-butyric acid methyl ester (see reference shown RSC Adv., 2014, 4, 15236).

The method described hereinafter was repeated at a multitude of points (matrix of points). In the case of our example the method is repeated at 80×80 points, spaced 5 nm apart from each other in such a way as to create a map of the carrier lifetime of the sample with a lateral resolution of 20 nm.

The method firstly comprises a step of measuring the parameter P via a Kelvin force microscopy technique at the point of interest in the absence of illumination. A value of $P_{dark}$ is as such obtained.

The method then comprises a step during which the point of interest is illuminated with a continuous light beam with an optical power of 4 mW by a laser beam of 2.5 mm². The method then comprises a step of measuring the parameter P at the point of interest. A value of $P_{sat}$ is as such obtained.

The method then comprises a series of steps, during which the point of interest is successively illuminated with continuous modulated light beams having a frequency $f_i$ and a duty cycle D. In this example, the duty cycle D is equal to 0.5. The frequency $f_i$ varies from 500 Hz to 3 kHz. For each beam of frequency $f_i$, the parameter P is measured at the point of interest in such a way as to obtain a value $P_{trans}^i$.

As such is obtained for the first point of interest of the sample the curve shown in FIG. 7 representing the evolution of $P_{trans}$ as a function of the frequency f of the modulated light beam at the point of interest.

It is also observed that the choice of the maximum frequency $f_{max}$ and of the minimum frequency $f_{min}$ is coherent with the criterion defined hereinabove since when $f_i$ is equal to $f_{max}$, the value $|P_{trans}-P_{dark}|$ measured is greater than or equal to $95\%*|P_{sat}-P_{dark}|=88.35$ mV (criterion valid for 1 value). The minimum frequency $f_{min}$ is chosen in such a way that, when $f_i$ is equal to $f_{min}$ the value $|P_{trans}-P_{dark}|$ measured is less than $105\%*D*P_{sat}-P_{dark}|=46.2$ mV, where D=0.5 (criterion valid for 2 values).

In order to have good precision on the estimation of the carrier lifetime, we have measured $P_{trans}$ for 6 frequencies with the frequency pitch constant.

As such, FIG. 7 shows the evolution of $P_{trans}$ in 6 frequencies as a function of the frequency f of the modulated light beam at the point of interest. The experimental values of $P_{dark}$ et de $P_{sat}$ are also shown.

The method then comprises a step of calculating the interpolation S.

According to an embodiment, the interpolation S can be obtained via the rectangle method. The interpolation S is then calculated using the following formula:

$$S = \sum_{i=1}^{i=N} (P_{trans}^i - P_{dark})(f_i - f_{i-1}) = 356000 \text{ mV} \cdot \text{Hz}$$

According to a second embodiment, the interpolation S can be obtained via the trapezoid method. The interpolation S is then calculated using the following formula:

$$S = \frac{1}{2} \sum_{i=1}^{i=N} (P_{trans}^i + P_{trans}^{i-1} - 2P_{dark})(f_i - f_{i-1}) = 332750 \text{ mV} \cdot \text{Hz}$$

With N=6, $f_0=0$, $f_1=f_{min}=500$ Hz and $f_N=f_{max}=3$ kHz
The method then comprises a step of calculating the carrier lifetime at the point of interest thanks to the following formula:

$$\tau = \frac{\frac{x_0^2}{2} + x_0(D-1) - K}{\frac{S}{(P_{sat} - P_{dark})} - (1+D)f_{max}}$$

With
$x_0 = 1.4$ for a duty cycle D of 0.5 and a coefficient of 0.95.

$$K = \frac{x_0^2}{2}h(x_0) - \frac{x_0^3}{6}h'(x_0) + \frac{x_0^4}{24}h''(x_0) - \frac{x_0^5}{120}h'''(x_0)$$
$$= \left(\frac{1.96}{2} + \frac{1.4}{12} + \frac{1.15}{24} + \frac{5.055}{168}\right)e^{-\frac{0.5}{1.4}} = 1,684$$

Finally, an estimation of the lifetime is obtained equal to:
382 µs via the rectangle method;
358 µs via the trapezoid method.

This method is then reproduced in a multitude of points of the sample in such a way as to obtain the map of the carrier lifetime shown in FIGS. 8a and 8b. As such, FIG. 8a shows the map of the carrier lifetime obtained using the rectangle method. FIG. 8b shows the map of the carrier lifetime obtained using the trapezoid method.

Second Example of Implementation

The method can also be implemented in the same way when the measurements are taken via electrostatic force microscopy. In this case, the parameter P is a frequency, measured in hertz.

Third Example of Implementation

The method can also be implemented in the same way when the measurements are taken via conductive atomic force microscopy. In this case, the parameter P is a current, measured in amperes.

Naturally the method is not limited to the embodiments described in the detailed description and alternatives could be considered without leaving the scope of the invention. As such, the limited development of the function h(x) at the point $x = x_0$ was carried out at order 3 in the detailed description, but the invention extends also to the case where a limited development of another order, lower or higher, is carried out. Moreover, other parameters P than those described could be measured, for example a courant tunnel measurement via STM (scanning tunneling microscopy).

Moreover, other quadrature formulas could be used to calculate S, such as for example, Simpson's rule or Romberg's method. However, the use of these other methods requires a larger number of measuring points which increases acquisition time and complicates the calculation.

It will be appreciated that the calculation steps of the above method are implemented in an embodiment by a computer comprising at least an interface, a physical processor and a non-transitory memory (also broadly referred to as a non-transitory machine readable or storage medium). The computer is a special purpose computer as it is programmed to perform the specific calculation steps of the method. The non-transitory memory is encoded or programmed with specific code instructions for carrying out the calculation steps. In particular, calculation steps described above can be carried out using code instructions embedded in the non-transitory memory. The non-transitory memory is arranged in communication with the physical processor so that the physical processor, in use, reads and executes the specific code instructions embedded in the non-transitory memory. The interface of the special purpose computer is arranged in communication with the physical processor and receives input parameters that are processed by the physical processor.

Having described and illustrated the principles of the invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

The devices, processors or processing devices described herein may be configured to execute one or more sequences of one or more instructions contained in a main memory or a computer readable medium. Execution of the sequences of instructions contained in a main memory or a computer readable medium causes the processor to perform at least some of the process steps described herein. One or more processors in a multi-processing arrangement may also be employed to execute the sequences of instructions contained in a main memory or a computer readable medium. In alternative embodiments, hard-wired circuitry may be used in place of or in combination with software instructions. Thus, embodiments are not limited to any specific combination of hardware circuitry and software.

The term "computer readable medium" as used herein refers to any physical medium that participates in providing instructions to a processor for execution. Such a medium may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor for execution.

It will be appreciated that the method described herein represents a solution to the technological problem currently faced by skilled artisans for accurately determining the carrier lifetime of a semiconductor material. The method describes above is greatly beneficial as it permits to map the carrier lifetime with good lateral resolution.

The invention claimed is:

1. A method for determining a carrier lifetime in at least one point of a surface of a sample, the method comprising:
    in the absence of illumination, measuring, at the point, a parameter P via an atomic force microscopy technique in such a way as to obtain a value $P_{dark}$;
    illuminating the point with a continuous light beam;
    measuring, at the point, the parameter P via the atomic force microscopy technique in such a way as to obtain a value $P_{sat}$;

successively illuminating the point with continuous modulated light beams each having a different frequency $f_i$, the frequency $f_i$ varying from one modulated light beam to the next, with the frequencies $f_i$ being between a minimum frequency $f_{min}$ and a maximum frequency $f_{max}$, with the modulated light beams having a duty cycle D;

for each modulated light beam, measuring, at the point, the parameter P via the atomic force microscopy technique in such a way as to obtain a value $P_{trans}^i$ for each frequency $f_i$;

calculating using a quadrature formula an interpolation S, at the point, of a curve representing $P_{trans}^i$ according to the frequencies $f_i$;

calculating the carrier lifetime T, at the point, by using the following formula:

$$\tau = \frac{\frac{x_0^2}{2} + x_0(D-1) - K}{\frac{S}{(P_{sat} - P_{dark})} - (1+D)f_{max}}$$

wherein $x_o$ and K are constants.

2. The method according to claim 1, wherein the interpolation S is calculated by the following quadrature formula:

$$S = \sum_{i=1}^{i=N} (P_{trans}^i - P_{dark})(f_i - f_{i-1}).$$

3. The method according to claim 1, wherein the interpolation S is calculated by the following quadrature formula:

$$S = \frac{1}{2}\sum_{i=1}^{i=N} (P_{trans}^i + P_{trans}^{i-1} - 2P_{dark})(f_i - f_{i-1}).$$

4. The method according to claim 1, wherein the interpolation S is calculated by the following quadrature formula:

$$S = (P_{trans}^N - P_{dark})\left(\frac{f_N \ f_{N-1}}{2}\right) + \sum_{i=1}^{i=N-1} (P_{trans}^i - P_{dark})\left(\frac{f_{i+1} \ f_{i-1}}{2}\right)$$

With $f_i$ representing the frequency and $f_0=0$, $f_1=f_{min}$ and $f_N=f_{max}$.

5. The method according to claim 1, wherein the constant $x_o$ has a value such that $g'(x_o)=0.95$ with $$g(x) = xe^{\frac{(D-1)}{x}}.$$

6. The method according to claim 1, wherein the constant K is given by the following formula:

$$K = \sum_0^n (-1)^n \frac{1}{(n+2)!} x_0^{n+2} \times e^{\frac{(D-1)}{x_0}}$$

$$\sum_{b_1+2b_2+\cdots+nb_n=n} \frac{n!}{b_1! b_2! \ldots b_n!} \prod_{j=1}^n \left(\frac{(1+D)^j}{x_0^{j+1}}\right)^{b_j}$$

wherein b is an element defined by $b1+2b2+\ldots+nbn=n$.

7. The method according to claim 1, wherein the atomic force microscopy technique is a Kelvin force microscopy technique, with the parameter P measured being a contact potential difference.

8. The method according to claim 1, wherein the atomic force microscopy technique is an electrostatic force microscopy technique, with the parameter P measured being a frequency.

9. The method according to claim 1, wherein the atomic force microscopy technique is a conductive atomic force microscopy technique, with the parameter P measured being a current.

10. The method according to claim 1, wherein the duty cycle D is equal to ½.

11. The method according to claim 1, wherein each modulated light beam is a laser beam.

12. A method for mapping of the carrier lifetime of the surface of the sample, the method comprising repeating the method for determining the carrier lifetime according to claim 1 at several points of the sample in such a way as to carry out a map of the carrier lifetime.

* * * * *